(12) United States Patent
Khan et al.

(10) Patent No.: US 11,068,875 B2
(45) Date of Patent: Jul. 20, 2021

(54) PERSON-TO-PERSON PAYMENTS USING ELECTRONIC DEVICES

(71) Applicant: Apple Inc., Cupertino, CA (US)

(72) Inventors: Ahmer A. Khan, Milpitas, CA (US); Timothy S. Hurley, Los Gatos, CA (US)

(73) Assignee: Apple, Inc., Cupertino, CA (US)

( * ) Notice: Subject to any disclaimer, the term of this patent is extended or adjusted under 35 U.S.C. 154(b) by 1102 days.

(21) Appl. No.: 14/502,135

(22) Filed: Sep. 30, 2014

(65) Prior Publication Data
US 2015/0186887 A1 Jul. 2, 2015

Related U.S. Application Data

(60) Provisional application No. 61/921,688, filed on Dec. 30, 2013.

(51) Int. Cl.
*G06Q 20/32* (2012.01)
*G06Q 20/22* (2012.01)
*G06Q 20/38* (2012.01)

(52) U.S. Cl.
CPC .......... *G06Q 20/32* (2013.01); *G06Q 20/223* (2013.01); *G06Q 20/3226* (2013.01); *G06Q 20/3278* (2013.01); *G06Q 20/3821* (2013.01)

(58) Field of Classification Search
CPC .......... G06Q 2220/00; G06Q 2220/10; G06Q 2220/16
See application file for complete search history.

(56) References Cited

U.S. PATENT DOCUMENTS

2005/0177716 A1* 8/2005 Ginter ................ G06F 21/10
713/157
2007/0255652 A1† 11/2007 Tumminaro
(Continued)

FOREIGN PATENT DOCUMENTS

| CN | 102282578 A | 12/2011 |
|----|-------------|---------|
| CN | 103270526 A | 8/2013 |

(Continued)

OTHER PUBLICATIONS

International Search Report on and the Written Opinion of the International Searching Authority, dated Feb. 13, 2015, for corresponding International Application No. PCTUS2014/068100, 11 pages.

(Continued)

*Primary Examiner* — Dante Ravetti
(74) *Attorney, Agent, or Firm* — Sterne, Kessler, Goldstein & Fox P.L.L.C.

(57) ABSTRACT

Using electronic devices (such as cellular telephones) that communicate wirelessly, two individuals can make person-to-person payments. In particular, an individual using an electronic device may identify another proximate electronic device of a counterparty in a financial transaction, and may provide an encrypted payment packet to the other electronic device that includes: a financial credential for a financial account of the individual, a payment amount, and a payment sign. When the other electronic device receives the encrypted payment applet, the counterparty may accept the payment in the financial transaction specified by the encrypted payment packet. Then, the other electronic device may provide the encrypted payment packet and another encrypted payment packet (with a financial credential for a financial account of the counterparty, the payment amount (Continued)

and the opposite payment sign) to a third party that completes the financial transaction.

20 Claims, 9 Drawing Sheets

(56) References Cited

U.S. PATENT DOCUMENTS

| | | |
|---|---|---|
| 2010/0082481 A1 | 4/2010 | Lin et al. |
| 2013/0054473 A1* | 2/2013 | Jan .................. G06Q 20/40975 705/71 |
| 2013/0160134 A1† | 6/2013 | Marcovecchio |
| 2013/0254052 A1† | 9/2013 | Royyuru |
| 2013/0308838 A1 | 11/2013 | Westerman et al. |
| 2016/0255097 A1* | 9/2016 | Smith .................. H04W 12/06 726/1 |

FOREIGN PATENT DOCUMENTS

| | | |
|---|---|---|
| EP | 2056261 A1 | 5/2009 |
| WO | WO-2010039337 A2 | 4/2010 |
| WO | WO-2012091349 A2 | 7/2012 |
| WO | WO 2015/102790 A1 | 7/2015 |

OTHER PUBLICATIONS

"EMV Mobile Contactless Payment: Technical Issues and Position Paper", Internet Citation, Oct. 1, 2007 (Oct. 1, 2007), pp. 1-37, XP007908266, Retrieved from the Internet: URL: http://www.emvco.com/mobile.aspx [retrieved on May 9, 2016].
International Preliminary Report on Patentability directed to related International Patent Application No. PCT/US2014/068100, dated Jul. 5, 2016; 8 pages.
Whitepaper entitled 'ARM Security Technology: Building a Secure System using TrustZone Technology', 2005-2009.†

* cited by examiner
† cited by third party

PERSON-TO-PERSON PAYMENTS USING ELECTRONIC DEVICES

CROSS REFERENCE TO RELATED APPLICATION

This application claims priority under 35 U.S.C. § 119(e) to U.S. Provisional Application Ser. No. 61/921,688, entitled "Person-to-Person Payments Using Electronic Devices," by Ahmer A. Khan and Timothy S. Hurley, filed on Dec. 30, 2013, the contents of which are herein incorporated by reference.

BACKGROUND

1. Field

The described embodiments relate generally to wireless communications, wireless electronic devices, and more specifically to techniques for conducting financial transactions by communicating encrypted financial credentials between the wireless electronic devices.

2. Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface).

There is presently increasing interest in using electronic devices to conduct financial transactions. However, it can be difficult for individuals to directly conduct financial transactions with each other using their electronic devices. For example, credit-card transactions are typically processed by a payment network, and it can be complicated and time-consuming for individuals to interact with a payment network to conduct a financial transaction with each other. In addition, credit-card providers usually charge higher fees for financial transactions where there is no proof that a physical credit card was present. If two individuals attempt to directly conduct a financial transaction, they may face higher fees, which may discourage them from using their electronic devices to conduct the financial transaction.

Thus, in spite of the considerable effort already devoted to the development of technology to support wireless financial transactions, further improvements are desirable.

SUMMARY

The described embodiments relate to a first electronic device that includes: an antenna; an interface circuit that wirelessly communicates with a second electronic device; and a secure element. During operation, the secure element: receives, from a user of the first electronic device, a payment command to conduct a financial transaction in which there is a payment with the second electronic device, where the payment command specifies a payment applet for a financial account stored in the secure element; and provides, to the second electronic device, an encrypted payment packet with a financial credential, a payment amount and a payment sign (i.e., positive or negative), where the financial credential is associated with the payment applet.

Note that the financial credential may include a device primary account number (DPAN) for the financial account. Moreover, the encrypted payment packet may include a digital signature. Furthermore, prior to providing the payment packet, the secure element may: generate the digital signature using a secure hash of a random number and the DPAN for the financial account, and encrypt the payment packet using an encryption key.

In some embodiments, the first electronic device includes a processor, and memory that stores a program module executed by the processor. The program module may include: instructions for receiving the payment command from the user; instructions for providing the payment command to the secure element; instructions for receiving the encrypted payment packet from the secure element; and instructions for providing the payment packet to the second electronic device. Moreover, the processor may include a secure enclave processor that securely communicates with the secure element using one or more encryption keys. Prior to the instructions for providing the payment command, the program module may include: instructions for requesting authentication information from the user; instructions for receiving the authentication information; and instructions for comparing the authentication information to stored authentication information using the secure enclave processor, where the payment command is provided to the secure element if the authentication information matches the predefined authentication information.

Furthermore, the interface circuit may communicate with a third electronic device associated with a second user. In these embodiments, the program module may include: instructions for receiving, from the third electronic device, a second encrypted payment packet with a second financial credential associated with a second payment applet for a second financial account, the payment amount, and a second payment sign that is the opposite of the payment sign; and instructions for providing, to the second electronic device, the second encrypted payment packet. Note that the payment amount and the payment sign in the encrypted payment packet may be specified by the second encrypted payment packet.

Alternatively, the payment amount may be: specified in the payment command; and predefined by the payment applet.

Additionally, the program module may include instructions for receiving, from the second electronic device, a notification that the financial transaction was completed.

Moreover, the second electronic device may be associated with a provider of the first electronic device. The second electronic device may use the DPANs associated with the payment applet and the second payment applet to conduct the financial transaction. Furthermore, the payment applet may be associated with: a prepaid debit card, a credit card, and/or a gift card.

Another embodiment provides the secure element for use with the first electronic device.

Another embodiment provides the third electronic device. This third electronic device may include similar components and functionality as the first electronic device. However, the payment command received by a second secure element in the third electronic device may identify the first electronic device, the payment amount, the second payment sign, and the second payment applet, for the second financial account, stored in the second secure element.

Another embodiment provides the second secure element for use with the third electronic device.

Another embodiment provides a method for conducting the financial transaction, which may be performed by an electronic device. During the method, the electronic device receives, from the third electronic device, the second encrypted payment packet, where the second encrypted payment packet includes the second financial credential associated with the second financial account, the payment amount and the second payment sign. Moreover, the electronic device provides, to the secure element in the electronic device, the payment command to conduct the financial transaction in which there is payment for the payment amount with the payment sign from the second financial account to the financial account, where the payment command specifies the payment applet, for the financial account, stored in the secure element. Then, the electronic device provides, to the second electronic device, the encrypted payment packet and the second encrypted payment packet, wherein the encrypted payment packet includes the financial credential associated with the financial account, the payment amount and the payment sign.

Another embodiment provides a system that includes the first electronic device and the third electronic device. This system may also include the second electronic device. In some embodiments of the system, when conducting the financial transaction, the first electronic device provides the encrypted payment packet to the second electronic device and the third electronic device separately provides the second encrypted payment packet to the second electronic device.

Another embodiment provides a method for providing prepaid credit to a financial vehicle (such as a debit card or a credit card), which may be performed by an electronic device and/or a secure element.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Using electronic devices (such as cellular telephones) that communicate wirelessly, two individuals can make person-to-person payments. In particular, an individual using an electronic device may identify another proximate electronic device of a counterparty in a financial transaction, and may provide an encrypted payment packet to the other electronic device that includes: a financial credential for a financial account of the individual, a payment amount, and a payment sign. When the other electronic device receives the encrypted payment applet, the counterparty may accept the payment in the financial transaction specified by the encrypted payment packet. Then, the other electronic device may provide the encrypted payment packet and another encrypted payment packet (with a financial credential for a financial account of the counterparty, the payment amount and the opposite payment sign) to a third party that completes the financial transaction. Subsequently, the electronic device and the other electronic device may receive a notification from the third party that the financial transaction is complete.

For example, the wireless communication between the electronic device and the other electronic device may involve conveying packets that are transmitted and received by radios in the electronic device and the other electronic device in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In addition, the communication protocol may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, a cellular-telephone communication technique is used as an illustrative example.

Figure 1:
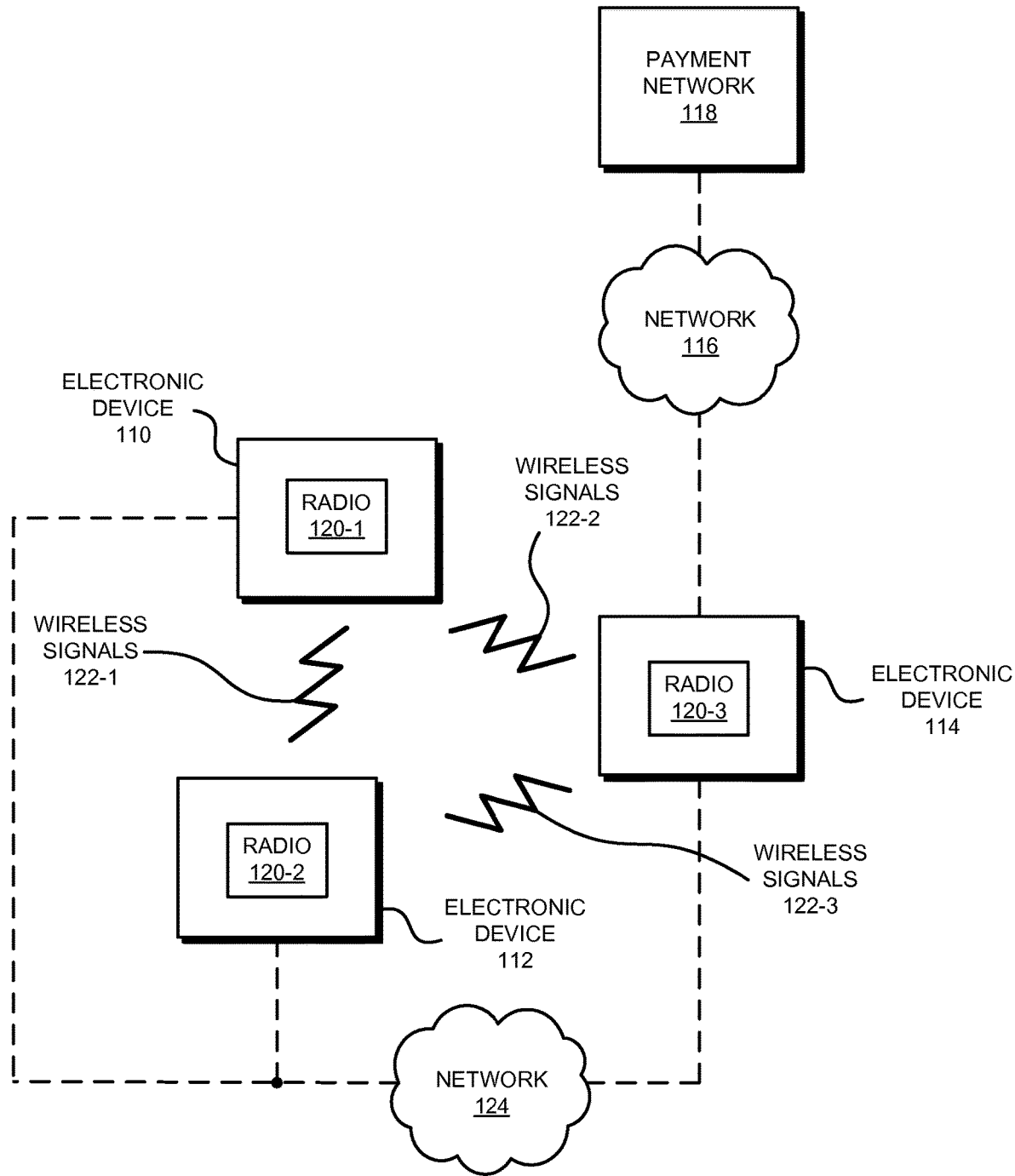
FIG. 1 is a block diagram illustrating electronic devices wirelessly communicating during a financial transaction in accordance with an embodiment of the present disclosure.

The communication between the electronic device and the other electronic device is shown in FIG. 1, which presents a block diagram illustrating electronic devices 110, 112 and 114 wirelessly communicating. As described further below with reference to FIGS. 4-6, these electronic devices may wirelessly communicate when conducting a person-to-person payment (and, more generally, a financial transaction). In particular, a first user of electronic device 110 may wish to provide a payment to a second user of electronic device 112. For example, the users may be splitting the bill for dinner. (However, more generally, the financial-transaction technique described below may be used to conduct financial transactions between electronic devices 110 and 112 for an arbitrary purpose. In this way, electronic devices 110 and 112 may be used to conduct mobile payments without requiring the use of a credit-card reader or a point-of-sale terminal.)

The first user may access a passbook or digital-wallet software application (executed by a processor in electronic device 110) that identifies electronic devices in proximity to electronic device 110. Then, as illustrated below with reference to FIG. 7, the first user may select electronic device 112, and may specify a payment amount and a payment sign. For example, the first user may indicate that they want to pay $20 to the user of electronic device 112 (i.e., a credit of $20 or +$20 to the second user or, alternatively, a debit of $20 or −$20 from the first user). Alternatively, the payment amount may be predefined by the payment applet (such as an available balance or prepaid amount associated with the payment applet).

In addition, the first user may select a payment applet that is stored in a secure element on electronic device 110. This payment applet may be for a financial account of the first user (such as a credit card, a debit card, a prepaid debit card, a gift card and, more generally, a financial vehicle provided by a financial institution, e.g., a bank). The payment applet may include a device primary account number (DPAN) for the financial account (and, more generally, a financial credential). This DPAN may be a 'virtual' credit card for the financial account, and it may correspond/map to a real financial primary account number (FPAN), such as a credit-card number.

In response to the first user's selections (which are sometimes referred to as a 'payment command'), electronic device 110 may authenticate the first user (if the first user has not been previously authenticated). For example, the processor may request that the first user provide authentication information. The authentication information may include a biometric identifier of the first user that is acquired by a biometric sensor in electronic device 110 (such as: a fingerprint sensor, a retinal sensor, a palm sensor, a digital signature-identification sensor, etc.). Alternatively or additionally, the authentication information may include: a personal identification number (PIN) associated with the payment applet that is received using a user-interface device (such as a keypad, a touch-sensitive display, optical character recognition and/or voice recognition); and/or a passcode for unlocking at least some functionality of electronic device 110 that is received using the user-interface device.

The biometric sensor and/or the user-interface device may provide the authentication information to a secure enclave processor in the processor (which securely communicates with components in electronic device 110 using one or more encryption keys) via secure (encrypted) communication. Then, the secure enclave processor may compare the authentication information to stored authentication information. If a match is obtained, the secure enclave processor may provide an encrypted token with an authentication-complete indicator to the secure element. Moreover, an authentication applet in the secure element may decrypt the encrypted token and may set one or more software flags (such as an authentication-complete flag) in an operating system of the secure element, which enables the payment applet to conduct the financial transaction. Alternatively, if a match is not obtained, the authentication process may be repeated, and the first user's payment command may not be further processed until a match is obtained.

Once the match is obtained, secure enclave processor may (via encrypted communication) provide the payment command (with the specified payment applet, payment amount and the payment sign, which in this case may be a debit) to the secure element. In response to receiving the payment command, the secure element may generate an encrypted payment packet. This encrypted payment packet may include: a financial credential associated with the payment applet (such as the DPAN), the payment amount and the payment sign. In addition, the encrypted payment packet may include a digital signature that is generated by the secure element using the DPAN and a random (or a pseudorandom) number. For example, the secure element may generate the digital signature using a secure hash (such as SHA-256) of the DPAN and the random number. Note that the secure element may encrypt the payment packet using an encryption key associated with the payment applet, such as a private encryption key. However, the encryption may use symmetric or asymmetric encryption techniques.

Next, the secure element may provide the encrypted payment packet to the secure enclave processor, which then uses a networking interface in electronic device 110 to wirelessly communicate the encrypted payment packet to electronic device 112.

When electronic device 112 receives the encrypted payment packet, a passbook digital-wallet software application (executed by a processor in electronic device 112) may indicate that the first user of electronic device 110 wants to pay the second user of electronic device 112 the payment amount (with the payment sign). The second user of electronic device 112 may accept the payment (such as the $20). In addition, the second user may select a second payment applet that is stored in a secure element on electronic device 112. This second payment applet may be for a second financial account of the second user of electronic device 112 (such as a credit card, a debit card, a prepaid debit card, a gift card and, more generally, a financial vehicle provided by a financial institution, e.g., a bank). The payment applet may include a second device primary account number (DPAN) for the second financial account (and, more generally, a second financial credential). This second DPAN may be a 'virtual' credit card for the financial account, and it may correspond/map to a real financial primary account number (FPAN), such as a credit-card number.

In response to the second user's selections (which are sometimes referred to as a second 'payment command'), electronic device 112 may authenticate the second user (if the second user has not been previously authenticated). For example, the processor may request that the second user provide authentication information. The authentication information may include a biometric identifier of the second user that is acquired by a biometric sensor in electronic device 112 (such as: a fingerprint sensor, a retinal sensor, a palm sensor, a digital signature-identification sensor, etc.). Alternatively or additionally, the authentication information may include: a personal identification number (PIN) associated with the payment applet that is received using a user-interface device (such as a keypad, a touch-sensitive display, optical character recognition and/or voice recognition); and/or a passcode for unlocking at least some functionality of electronic device 112 that is received using the user-interface device.

The biometric sensor and/or the user-interface device may provide the authentication information to a secure enclave processor in the processor (which securely communicates with components in electronic device 112 using one or more encryption keys) via secure (encrypted) communication. Then, the secure enclave processor may compare the authentication information to stored authentication information. If a match is obtained, the secure enclave processor may provide an encrypted token with an authentication-complete indicator to the secure element. Moreover, an authentication applet in the secure element may decrypt the encrypted token and may set one or more software flags (such as an authentication-complete flag) in an operating system of the secure element, which enables the payment applet to conduct the financial transaction. Alternatively, if a match is not obtained, the authentication process may be repeated, and the second user's payment command may not be further processed until a match is obtained.

Once the match is obtained, the secure enclave processor may (via encrypted communication) provide the second payment command to the secure element. This second payment command may include the specified payment applet. The payment amount and the payment sign (which in this case may be a credit, and thus is the opposite of the payment sign in the encrypted payment packet received from electronic device 110) may also be provided. Alternatively, the payment amount and the payment sign may, directly or indirectly, be specified by the encrypted payment packet received from electronic device 110, which is communicated to the secure element. In response to receiving the second payment command, the secure element may generate a second encrypted payment packet. This second encrypted payment packet may include: the second financial credential associated with the second payment applet (such as the second DPAN), the payment amount and the payment sign (which is the opposite of the payment sign in the encrypted payment packet). In addition, the second encrypted payment packet may include a digital signature that is generated by the secure element using the second DPAN and a second random (or a pseudorandom) number. For example, the secure element may generate the digital signature using a secure hash (such as SHA-256) of the second DPAN and the second random number. Note that the secure element may encrypt the second payment packet using an encryption key associated with the second payment applet, such as a private encryption key. However, the encryption may use symmetric or asymmetric encryption techniques.

Next, the secure element may provide the second encrypted payment packet to the secure enclave processor, which then uses a networking interface in electronic device 112 to wirelessly communicate the encrypted payment packet and the second encrypted payment packet to electronic device 114. This electronic device may be associated with a provider of electronic devices 110 and 112 (such as server computers and related networking equipment associated with the provider of electronic devices 110 and 112, and, more generally, hardware under the control of and/or otherwise performing actions on behalf of the provider of electronic devices 110 and 112). Electronic device 114 may decrypt the payment packets using encryption keys (such as public encryption keys for the payment applet and the second payment applet) that are available to electronic device 114. Moreover, electronic device 114 may complete the financial transaction (such as the payment from the user to the second user) using the financial credential and the second financial credential, as well as the payment amount and the respective payment signs. Note that completing the financial transaction may involve crediting and debiting, respectively, the second financial account and the financial account. In addition, electronic device 114 may communicate the information specified in the payment packet and the second payment packet to a payment network 118 and, thus, to financial institutions associated with the financial account and the second financial account via a network 116. (Note that what is meant by payment network 118, etc., is hardware, such as server computers and related networking equipment, under the control of and/or otherwise performing actions on behalf of such entities.)

In some embodiments, prior to communicating the information to payment network 118, electronic device 114 maps from the DPAN and the second DPAN to, respectively, the FPAN and the second FPAN. Alternatively, this mapping may be performed by payment network 118.

After electronic device 114 completes the financial transaction (or is notified by payment network 118 that the financial transaction is complete), electronic device 114 may provide notifications (such as a push notification, which the user and the second user may have previously registered to receive) to electronic devices 110 and 112 that the financial transaction is complete. Each of electronic devices 110 and 112 may display the notification. For example, the passbook on electronic device 110 may display (on a display in electronic device 110) that $20 has been paid to the second user of electronic device 112, and the passbook on electronic device 112 may display (on a display in electronic device 112) that $20 has been paid by the user of electronic device 110.

In a variation on the aforementioned financial-transaction technique, instead of providing the encrypted payment application to electronic device 112, electronic device 110 may provide the encrypted payment application (which specifies electronic device 112) to electronic device 114. In this case, the second payment command provided by the second user of electronic device 112 may specify electronic device 110, the payment amount and the payment sign, and this information may be included in the second encrypted payment application. Furthermore, electronic device 112 may provide the second encrypted payment application to electronic device 114. Once electronic device 114 has received the encrypted payment application and the second encrypted payment application, electronic device 114 may complete the financial transaction (as described previously).

As described further below with reference to FIGS. 8 and 9, the capabilities of electronic devices 110 and 112 may also be used to provide prepaid credit to a financial vehicle, such as a payment applet stored on a secure element.

In these ways, electronic devices 110, 112 and 114 may be used to securely and flexibly conduct financial transactions, such as person-to-person payments. This financial-transaction technique may allow the individuals to seamlessly conduct the financial transactions without having to navigate the complexities of interacting with payment network 118 or the financial institutions. In addition, the information included in the payment packets may be sufficient to establish that the payment applets (which are proxies for financial vehicles, such as credit cards, associated with the financial accounts) were physically present during the financial transaction. Thus, the financial-transaction technique may ensure that the fees charged by the financial institutions for the financial transaction may be lower, thereby encouraging the users of electronic devices 110 and 112 to conduct financial transactions using electronic devices 110 and 112 (and, more generally, encouraging commercial activity).

As noted previously, the wireless communication among electronic devices 110, 112 and/or 114 may involve the exchange of packets that include the financial information (such as the financial credentials, the digital signatures, the payment amounts, the payment signs, etc.). These packets may be included in frames in one or more wireless channels.

As described further below with reference to FIG. 2, electronic devices 110, 112 and 114 may include subsystems, such as: a networking subsystem, a memory subsystem, a processing subsystem and a secure subsystem. In addition, electronic devices 110, 112 and 114 may include radios 120 in the networking subsystems. More generally, electronic devices 110, 112 and 114 can include (or can be included within) any electronic devices with networking subsystems that enable electronic devices 110, 112 and 114 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 122-1 (represented by a jagged line) are transmitted from/received by a radio 120-1 in electronic device 110. These wireless signals are received by/transmitted from radio 120-2 in electronic device 112. Similarly, wireless signals 122-2 and 122-3 (represented by jagged lines) are transmitted from/received by radio 120-3 in electronic device 114, and are received by/transmitted from radios 120-1 and 120-2 in electronic devices 110 and 112. (Note that the communication among electronic devices 110, 112 and/or 114 may also occur via network 124, which may involve wired communication with a different communication protocol than wireless signals 122.) Moreover, the wireless communication may or may not involve a connection being established among electronic devices 110, 112 and/or 114, and therefore may or may not involve communication via a wireless network (such as a cellular-telephone network).

In the described embodiments, processing a packet or frame in electronic devices 110, 112 and 114 includes: receiving wireless signals 122 with the packet or frame; decoding/extracting the packet or frame from received wireless signals 122 to acquire the packet or frame; and processing the packet or frame to determine information contained in the packet or frame (such as the certification information).

Although we describe the environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the electronic device. FIG. 2 presents a block diagram illustrating electronic device 110. This electronic device includes processing subsystem 210, memory subsystem 212, networking subsystem 214, authentication subsystem 216-1 and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220-1 (which is a system-on-chip within one or more processors in processing subsystem 210) that performs security services for other components in the processing subsystem 210 and that securely communicates with other subsystems in electronic device 110. Secure enclave processor 220-1 may include one or more processors, a secure boot ROM, one or more security peripherals, and/or other components. The security peripherals may be hardware-configured to assist in the secure services performed by secure enclave processor 220-1. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220-1 are stored in a trust zone in memory subsystem 212 that is assigned to secure enclave processor 220-1, and secure enclave processor 220-1 fetches the instructions from the trust zone for execution. Secure enclave processor 220-1 may be isolated from the rest of processing subsystem 210 except for a carefully controlled interface, thus forming a secure enclave for secure enclave processor 220-1 and its components. Because the interface to secure enclave processor 220-1 is carefully controlled, direct access to components within secure enclave processor 220-1 (such as a processor or a secure boot ROM) may be prevented. In some embodiments, secure enclave processor 220-1 encrypts and/or decrypts authentication information communicated with authentication subsystem 216-1, and encrypts and/or decrypts information (such as tokens) communicated with secure subsystem 218. Furthermore, secure enclave processor 220-1 may compare authentication information with stored authentication and, if a match is obtained, may provide an encrypted token with an authentication-complete indicator to a secure element 230-1.

Memory subsystem 212 includes one or more devices for storing data and/or instructions for processing subsystem 210, networking subsystem 214, authentication subsystem 216-1 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an antenna 224. For example, networking subsystem 214 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110 may use the mechanisms in networking subsystem 214 for performing simple wireless communication among electronic devices 110, 112 (FIG. 1) and 114 (FIG. 1), e.g., transmitting advertising frames and/or near-field communication.

Authentication subsystem 216-1 may include one or more processors, controllers and devices for receiving the authentication information from a user of electronic device 110, and for securely communicating this authentication information to processing subsystem 210 (such as by encrypting the authentication information). For example, the authentication information may include: a biometric identifier acquired by a biometric sensor 226 (such as: a fingerprint sensor, a retinal sensor, a palm sensor, a digital signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 110 that is received using user-interface device 228.

Furthermore, secure subsystem 218 may include a secure element 230-1, which includes one or more processors and memory. Note that secure element 230-1 may be a tamper-resistant component that is used in electronic device 110 to provide the security, confidentiality, and multiple application environments required to support various business models. Secure element 230-1 may exist in one or more of a variety of form factors, such as: a universal integrated circuit card (UICC), an embedded secure element (on a circuit board in electronic device 110), a smart secure digital (SD) card, a smart microSD card, etc.

Moreover, secure element 230-1 may include one or more applets or applications that execute in an environment of secure element 230-1 (such as in the operating system of secure element 230-1, and/or in a Java runtime environment executing on the secure element 230-1). For example, the one or more applets may include an authentication applet 232 that: performs contactless registry services, encrypts/decrypts packets or tokens communicated with secure enclave processor 220-1, sets one or more software flags (such as an authentication-complete flag 234) in an operating system of secure element 230-1, and/or conveys information to one or more payment applets 236. The one or more applets may include one or more payment applets 236 that conduct financial transactions with electronic device 112 (FIG. 1) when they are activated by program module 246, and based on the one or more software flags and/or when electronic device 110 is proximate to electronic device 112 (FIG. 1). In particular, payment applets 236 may each be associated with a financial vehicle (such as a credit card, a debit card, a prepaid debit card, a gift card and, more generally, a financial vehicle provided by a financial institution, e.g., a bank, that is associated with a financial account of a user, such as a user of electronic device 110). In addition, as described further below with reference to FIG. 3, secure element 230-1 may include information associated with the one or more payment applets 236 (such as a financial credential and one or more encryption keys that are associated with a given payment applet) that is used when conducting the financial transactions.

Authentication applet 232 may execute in a master or issuer security domain in secure element 230-1 (such as controlling authority security domain), while payment applets 236 may execute in supplemental security domains. Communication between these security domains may be encrypted using different encryption/decryption keys that are security-domain specific. In electronic device 110 and/or during communication between electronic devices 110, 112 (FIG. 1) and/or 114 (FIG. 1), encryption/decryption may involve symmetric and/or asymmetric encryption. In addition, as described further below with reference to FIGS. 4-6, the information communicated may also include a digital signature that is specific to electronic device 110 and/or components in electronic device 110, such as secure element 230-1 or one of payment applets 236.

Figure 3:
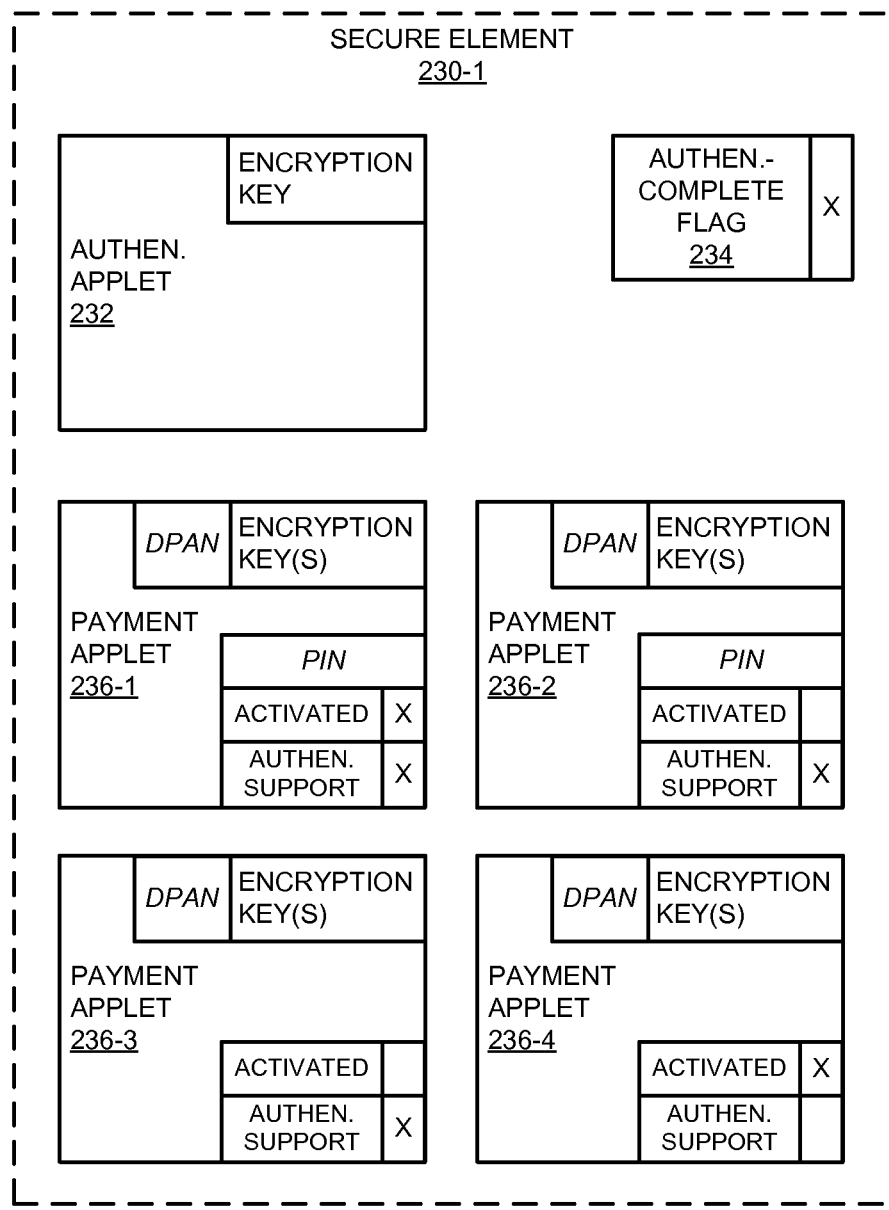
FIG. 3 is a block diagram illustrating the secure element in the electronic device in FIG. 2 in accordance with an embodiment of the present disclosure.

The data stored in secure element 230-1 is further illustrated in FIG. 3. In particular, for each of payment applets 236, secure element 230-1 may store: whether a given payment applet is active (in response to an activation command); and whether or not authentication-complete flag 234 is supported by/applies to the given payment applet. In some embodiments there are one or more payment applets (such as payment applet 236-4) for which authentication-complete flag 234 does not apply. In some embodiments, secure element 230-1 stores, for at least one of payment applets 236, a PIN or a debit-card number that is associated with this payment applet. For example, as shown in FIG. 3, payment applets 236-1 and 236-2 may store associated PINs. Additionally, one or more of the payment applets may store the associated financial information, such as the financial credentials. In addition, a given one of payment applets 236 specified in a particular financial transaction may generate a digital signature based on a financial credential of the payment applet and a random (or a pseudorandom) number, and may encrypt a payment packet using an encryption key associated with the payment applet.

Referring back to FIG. 2, during operation of electronic device 110 the user may use passbook 248 to select or activate one or more of payment applets 236 (such as payment applets 236-1 and 236-4). If payment applet 236-1 supports authentication-complete flag 234 (as indicated by the enabling or setting of authentication support in payment applet 236-1), in order for payment applet 236-1 to conduct a financial transaction with electronic device 112 (FIG. 1), payment applet 236-1 may need to be activated and authentication-complete flag 234 may need to be set or enabled in secure element 230-1 (indicating that the user has been authenticated). In contrast, for payment applet 236-4, which does not support authentication-complete flag 234 (as indicated by disabling of authentication support in payment applet 236-4), a financial transaction may be conducted when payment applet 236-4 is active (i.e., operation of payment applet 236-4 is not gated by the setting or enabling of authentication-complete flag 234 in secure element 230-1). While the present discussion illustrates the use of a global authentication-complete flag, note that in some embodiments there are separate authentication-complete flags associated with at least some of the payment applets 236 (i.e., there may be a specific authentication-complete flag for payment applet 236-1, etc.).

When secure enclave processor 220-1 provides a payment command to secure element 230-1, one of the specified, activated and/or authenticated payment applets 236 (such as payment applet 236-1) may provide the encrypted payment packet to interface circuit 222 or to secure enclave processor 220-1 (which then provides the encrypted payment packet to interface circuit 222). Then, interface circuit 222 may communicate the encrypted payment packet to electronic device 112 (FIG. 1) using antenna 224. Alternatively, interface circuit 222 may communicate the encrypted payment packet and an encrypted payment packet that was previously received from electronic device 112 (FIG. 1) to electronic device 114 (FIG. 1) using antenna 224.

Once the financial transaction is complete, a notification from electronic device 114 (FIG. 1) may be received by interface circuit 222. Passbook 248 may provide the notification to display subsystem 240 for display, so the user of electronic device 110 can be alerted that the financial transaction was successfully completed.

Within electronic device 110, processing subsystem 210, memory subsystem 212, networking subsystem 214, authentication subsystem 216-1 and secure subsystem 218 may be coupled using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 110 can detect tampering with secure components (such as secure enclave processor 220-1, secure element 230-1 and/or bus 238) and may destroy encryption/decryption keys or authentication information (such as a stored biometric identifier) if tampering is detected.

In some embodiments, the electronic device includes display subsystem 240 for displaying information on a display (such as a notification of a successfully completed financial transaction), which may include a display driver and the display, such as a liquid-crystal display, a multi-touch touchscreen, etc. In addition, in some embodiments the electronic device includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216-1.

Electronic device 110 can be (or can be included in) any electronic device with at least one network interface. For example, electronic device 110 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems and/or secure I/O subsystems. Additionally, one or more of the subsystems may not be present in electronic device 110. Moreover, in some embodiments, electronic device 110 may include one or more additional subsystems that are not shown in FIG. 2. For example, electronic device 110 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 110. For example, in some embodiments program module 246 is included in operating system 244. Alternatively or additionally, at least some of the functionality of program module 246 may be included in passbook 248.

Moreover, the circuits and components in electronic device 110 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 110. Moreover, the integrated circuit may include hardware and/or software mechanisms that are used for transmitting wireless signals from electronic device 110 to, and receiving signals at electronic device 110 from, electronic device 112 (FIG. 1) and/or electronic device 114 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a cellular-telephone network was used as an illustrative example, the described embodiments of the financial-transaction technique may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

While the preceding discussion focused on the hardware, software and functionality in electronic device 110, electronic devices 112 (FIG. 1) and/or 114 (FIG. 1) may have the same or similar hardware (processors, memory, networking interfaces, etc.) and/or software to support the operations performed by these entities, as described further below with reference to FIGS. 4-6 and 8-9. In particular, these entities may include one or more computer systems with a processing subsystem that executes one or more program modules stored in a memory subsystem to perform the operations, and one or more networking interfaces for communicating with other electronic devices, such as electronic device 110.

Figure 4:
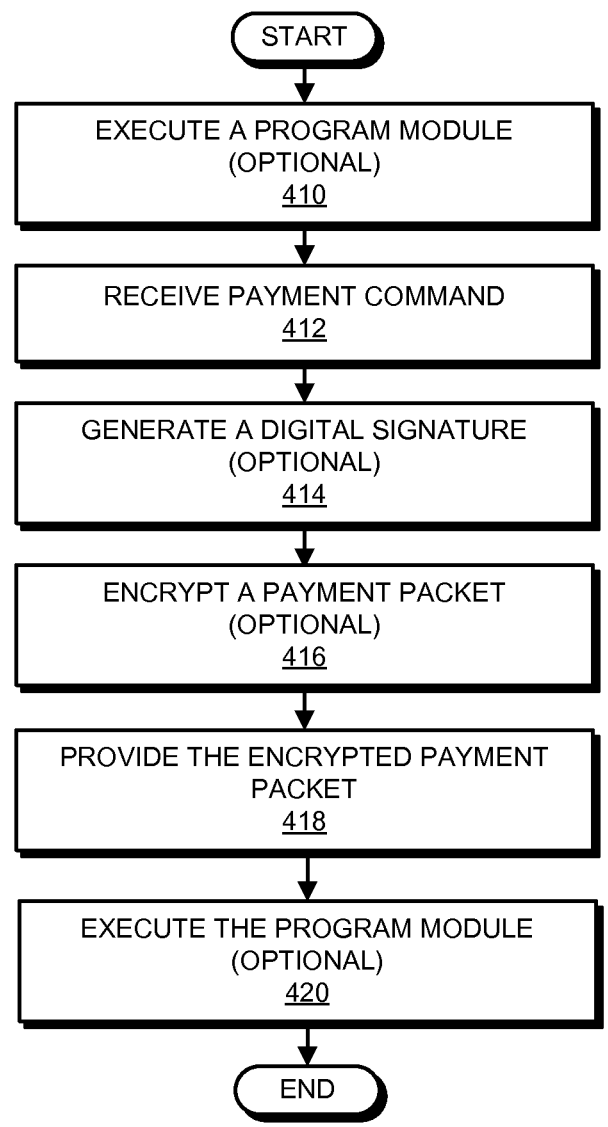
FIG. 4 is a flow diagram illustrating a method for conducting a financial transaction using one of the electronic devices in FIG. 1 in accordance with an embodiment of the present disclosure.

We now describe embodiments of the financial-transaction technique. FIG. 4 presents a flow diagram illustrating a method 400 for conducting a financial transaction, which may be performed by a processor in a secure element (such as secure element 230-1 in FIG. 2) in an electronic device (such as electronic device 110 in FIGS. 1 and 2). During operation, the processor receives, from a user of the electronic device, a payment command (operation 412) to conduct a financial transaction in which there is a payment with a second electronic device (such as electronic device 112 in FIG. 2), where the payment command specifies a payment applet, for a financial account, stored in the secure element, a payment amount, a payment sign and the second electronic device.

Then, the processor may optionally generate a digital signature (operation 414) using a secure hash of a random number and a financial credential (such as a DPAN) associated with the payment applet for the financial account. Moreover, the processor may optionally encrypt a payment packet (operation 416) using an encryption key, such as an encryption key associated with the payment applet. The encrypted payment packet may include the financial credential, the payment amount and the payment sign (or, more generally, whether the payment is a credit or a debit to the financial account).

Furthermore, the processor provides, to a second electronic device (such as electronic device 112 in FIG. 1), the encrypted payment packet (operation 418).

Figure 2:
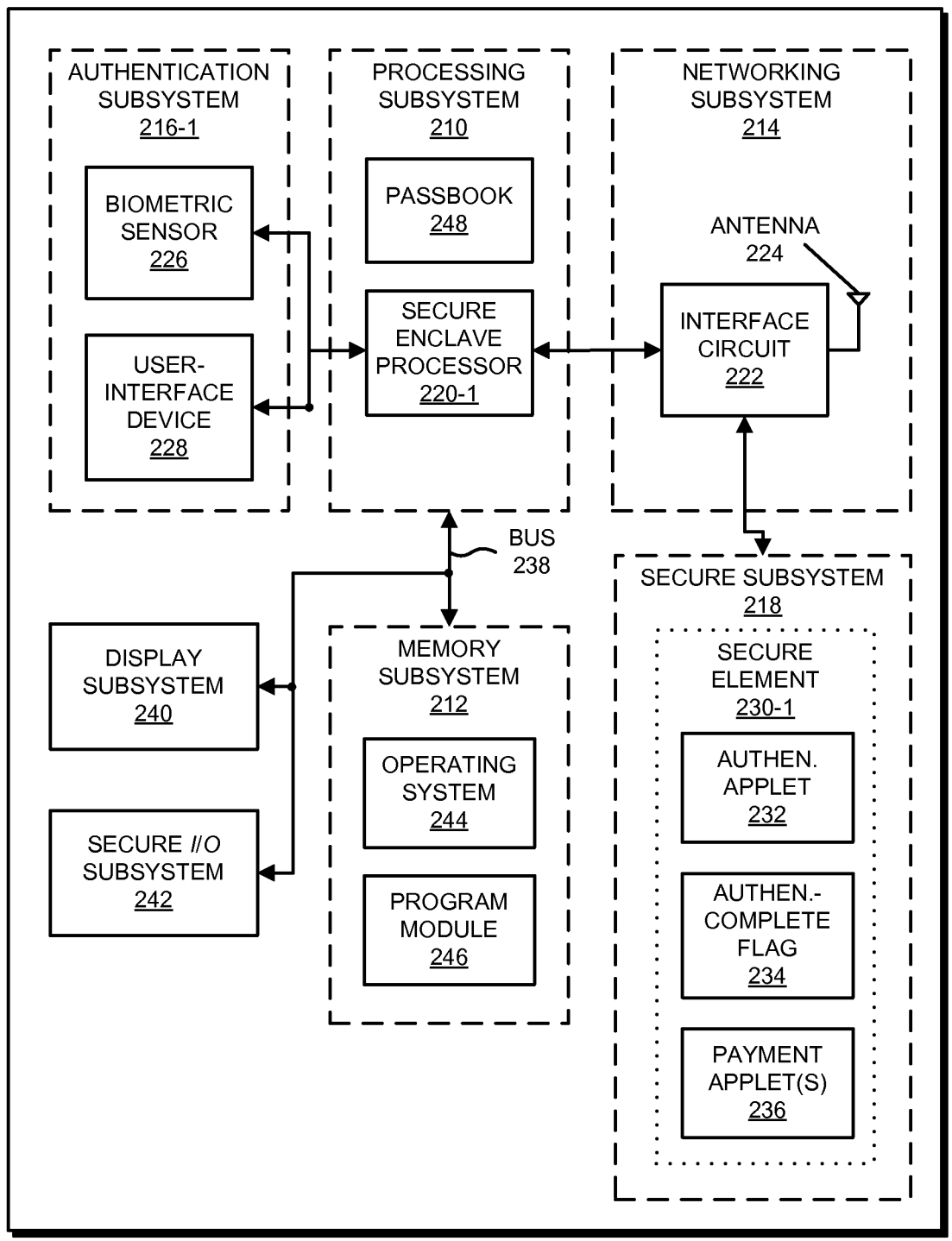
FIG. 2 is a block diagram illustrating one of the electronic devices of FIG. 1 in accordance with an embodiment of the present disclosure.

In some embodiments, during method 400, another processor in the electronic device (such as secure enclave processor 220-1 in FIG. 2) optionally executes a program module (operation 410), such as program module 246 in FIG. 2). When executing the program module in operation 410, the other processor may: receive the payment command from the user; and provide the payment command to the secure element. Moreover, the other processor may: request authentication information from the user; receive the authentication information; and compare the authentication information to stored authentication information. The payment command may be provided by the other processor to the secure element if the authentication information matches the predefined authentication information.

Furthermore, the other processor may optionally execute the program module (operation 420) after the processor in the secure element provides the encrypted payment packet (operation 418). When executing the program module in operation 420, the other processor may: receive the encrypted payment packet from the secure element; and provide the encrypted payment packet to the second electronic device.

Figure 5:
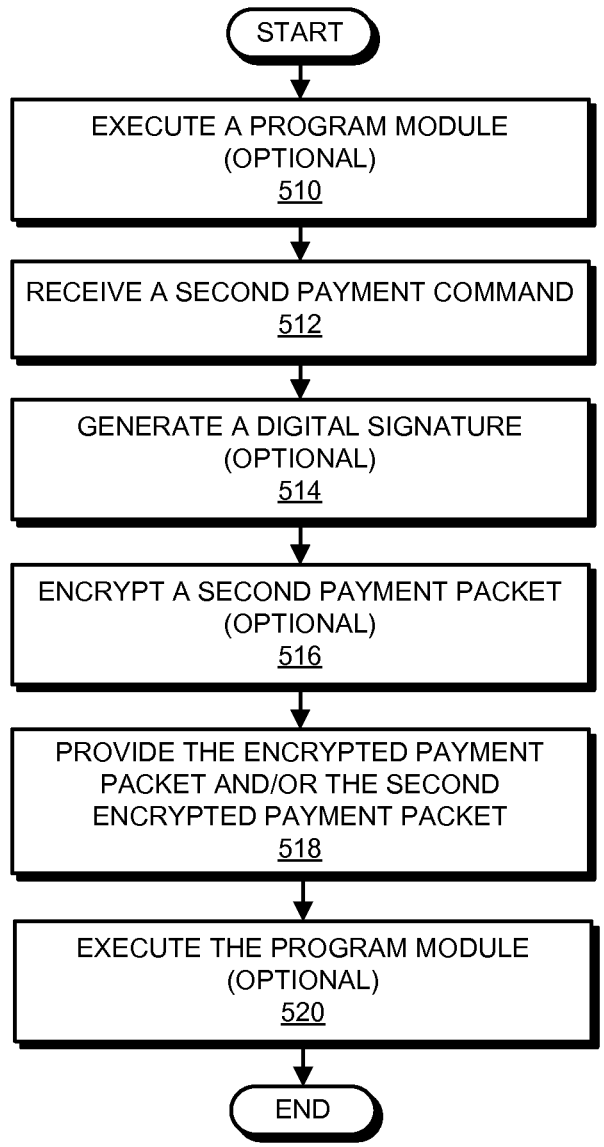
FIG. 5 is a flow diagram illustrating a method for conducting a financial transaction using another of the electronic devices in FIG. 1 in accordance with an embodiment of the present disclosure.

FIG. 5 presents a flow diagram illustrating a method 500 for conducting a financial transaction, which may be performed by a processor in a second secure element (such as secure element 230-1 in FIG. 2) in the second electronic device (such as electronic device 112 in FIG. 1). During operation, the processor receives, from a second user of the second electronic device, a second payment command to conduct a financial transaction (operation 512) in which there is a payment from the electronic device (such as electronic device 110 in FIGS. 1 and 2), where the second payment command specifies a second payment applet, for a second financial account, stored in the second secure element.

Then, the processor may optionally generate a digital signature (operation 514) using a secure hash of a second random number and a second financial credential (such as a second DPAN) associated with the second payment applet for the second financial account. Moreover, the processor may optionally encrypt a second payment packet using an encryption key (operation 516), such as an encryption key associated with the second payment applet. The second encrypted payment packet may include the second financial credential, the payment amount and a payment sign (or, more generally, whether the payment is a credit or a debit to the financial account). This payment sign may be the opposite of the payment sign in the encrypted payment packet. Note that the payment amount and the payment sign in the second encrypted payment packet may be specified by the encrypted payment packet.

Furthermore, the processor provides, to a third electronic device (such as electronic device 114 in FIG. 1), the encrypted payment packet and/or the second encrypted payment packet (operation 518).

In some embodiments, during method 500, another processor in the second electronic device (such as secure enclave processor 220-1 in FIG. 2) optionally executes a program module (operation 510), such as program module 246 in FIG. 2). When executing the program module in operation 510, the other processor may: receive the encrypted payment packet from the electronic device; receive the second payment command from the second user; and provide the second payment command to the secure element. Moreover, the other processor may: request authentication information from the second user; receive the authentication information; and compare the authentication information to stored authentication information. The second payment command may be provided by the other processor to the secure element if the authentication information matches the predefined authentication information.

Furthermore, the other processor may optionally execute the program module (operation 520) after the processor in the secure element provides the encrypted payment packet and/or the second encrypted payment packet (operation 518). When executing the program module in operation 520, the other processor may: receive the second encrypted payment packet from the secure element; and provide the encrypted payment packet and/or the second encrypted payment packet to the third electronic device. Additionally, the other processor may: receive, from the third electronic device, a notification that the financial transaction was completed.

Figure 6:
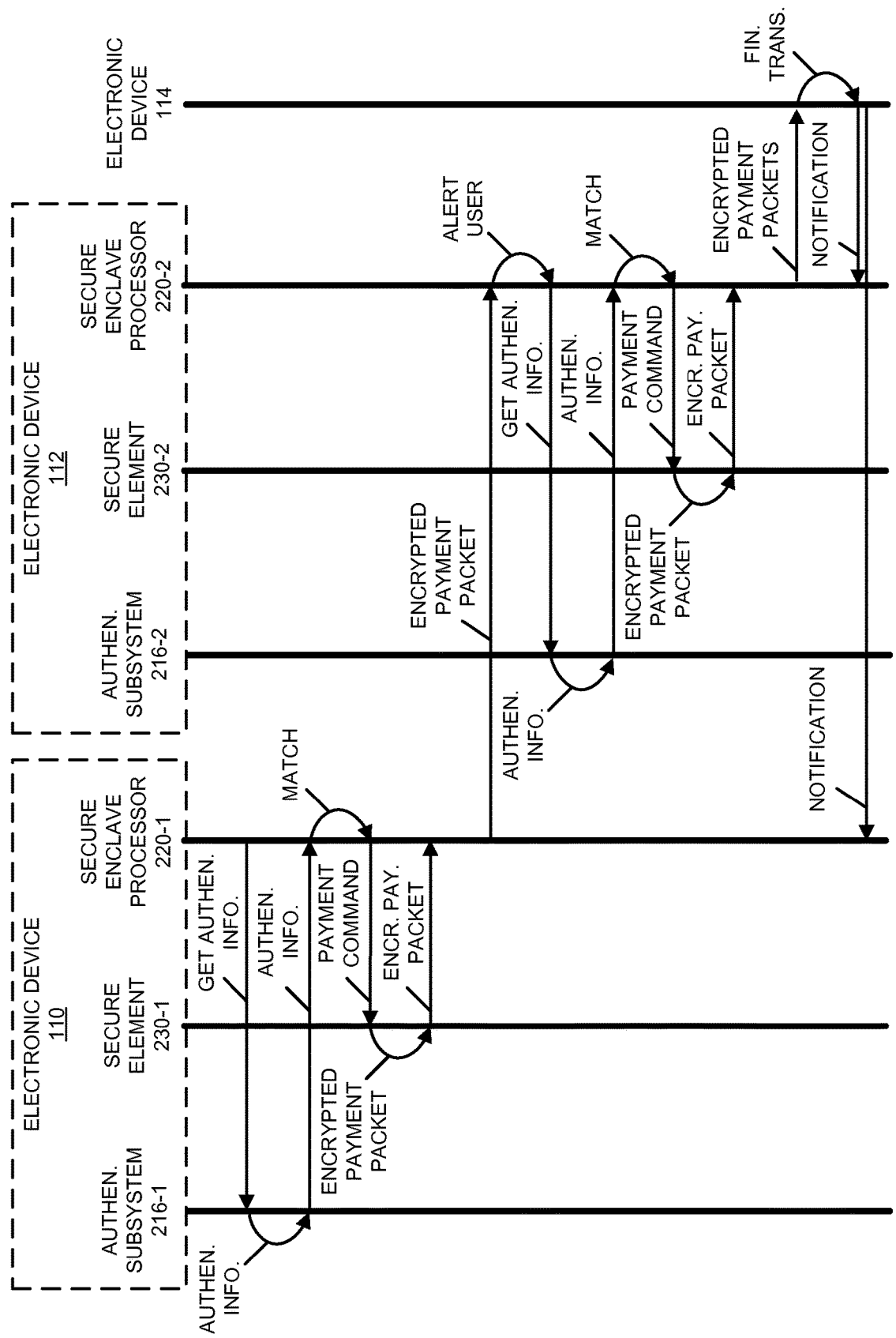
FIG. 6 is a drawing illustrating communication among the electronic devices of FIG. 1 in accordance with an embodiment of the present disclosure.

We now describe FIG. 6, which presents a drawing illustrating communication within electronic device 110 (FIGS. 1 and 2), within electronic device 112 (FIG. 1) and among electronic devices 110, 112 and 114 (FIG. 1), and which provides further information regarding the aforementioned financial-transaction technique of FIG. 4. In particular, a user of electronic device 110 may provide the payment command to secure enclave processor 220-1. In response, secure enclave processor 220-1 may request authentication information from authentication subsystem 216-1.

After authentication subsystem 216-1 receives the authentication information from the user, authentication subsystem 216-1 provides the authentication information to secure enclave processor 220-1. Then, secure enclave processor 220-1 compares the authentication information to stored authentication information. If there is a match, secure enclave processor 220-1 provides an authentication-complete indicator to secure element 230-1, which may set a software flag.

Next, secure enclave processor 220-1 may provide the payment command to secure element 230-1. In response, a specified payment applet may be activated. In addition, secure element 230-1 may generate and provide the encrypted payment packet to secure enclave processor 220-1. Moreover, secure enclave processor 220-1 may provide the encrypted payment packet to electronic device 112.

In response to receiving the encrypted payment packet, secure enclave processor 220-2 in electronic device 112 may alert the second user of electronic device 112 that a financial transaction is pending. Then, secure enclave processor 220-2 may receive the second payment command from the second user. In response, secure enclave processor 220-2 may request authentication information from authentication subsystem 216-2.

After authentication subsystem 216-2 receives the authentication information from the second user, authentication subsystem 216-2 provides the authentication information to secure enclave processor 220-2. Then, secure enclave processor 220-2 compares the authentication information to stored authentication information. If there is a match, secure enclave processor 220-2 provides an authentication-complete indicator to secure element 230-2, which may set a software flag.

Next, secure enclave processor 220-2 may provide the second payment command to secure element 230-2. In response, a specified payment applet may be activated. In addition, secure element 230-2 may generate and provide the second encrypted payment packet to secure enclave processor 220-2. Moreover, secure enclave processor 220-2 may provide the encrypted payment packet and the second encrypted payment packet to electronic device 114.

Electronic device 114 may use the information included in the encrypted payment packet and the second encrypted payment packet to complete the financial transaction. Then, electronic device 114 may provide notifications to electronic devices 110 and 112 that the financial transaction was completed.

Note that the operations illustrated in FIG. 6 may include challenge and response operations, which are not shown for clarity. In addition, communication via instances of interface circuit 222 (FIG. 2) is not shown for clarity.

Figure 7:
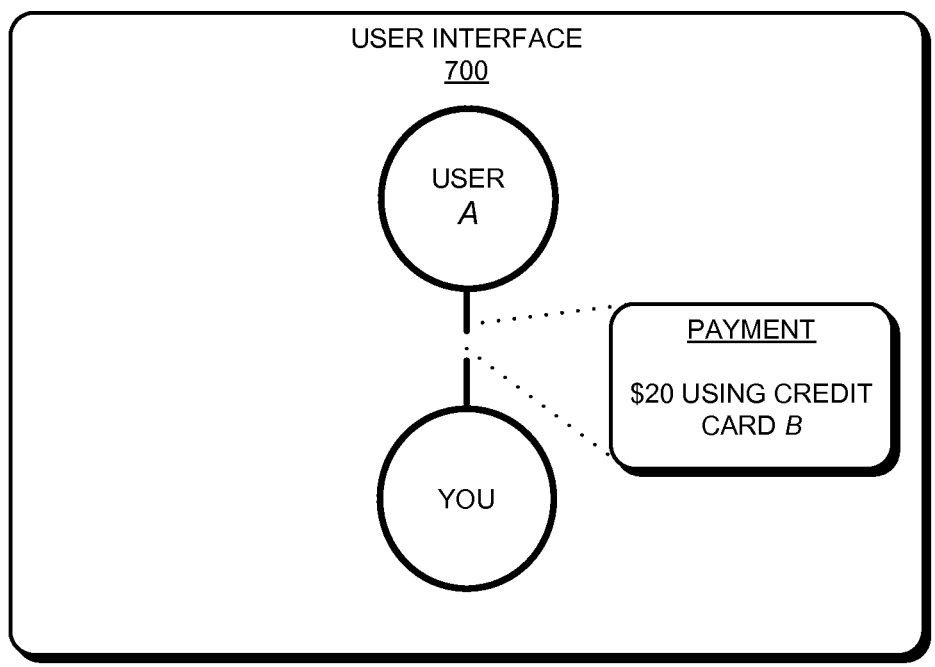
FIG. 7 is a drawing illustrating a user interface associated with the method of FIG. 4 in accordance with an embodiment of the present disclosure.

As noted previously, a user interface, associated with the passbook, and which is displayed on the electronic device, may be used to identify proximate electronic devices and/or to specify details of the financial transaction (such as the payment amount and the payment sign). This is shown in FIG. 7, which presents a drawing of a user interface 700. In particular, user interface 700 may display electronic devices that are proximate to the user's electronic device (for example, the proximate electronic devices may be identified via wireless communication). The user may select one of the displayed electronic devices by touching an icon that represents an electronic device. Next, the user may enter a payment amount (and payment sign) into a displayed window in user interface 700. If the user has not already activated or selected a payment applet, user interface 700 may then display available payment applets, and may receive the user's selection. In addition, if the selected payment applet requires authentication, and the user has not already been authenticated, user interface 700 may display a prompt to the user to provide authentication information (such as 'Please touch the fingerprint sensor'). This prompt may be displayed until the user has been successfully authenticated. Furthermore, user interface 700 may intuitively indicate that the financial transaction is pending (using an hourglass or by modulating the intensity of the selected displayed electronic device). Once the financial transaction is complete, user interface 700 may eliminate these intuitive sensory clues and/or may display a window that indicates that the financial transaction was completed.

As noted previously, the capabilities of electronic devices 110, 112 and 114 in FIG. 1 may be used to provide prepaid credit to a financial vehicle, such as a payment applet stored on a secure element. This is shown in FIG. 8, which presents a flow diagram illustrating a method 800 for providing prepaid credit to a financial vehicle (such as a debit card or a credit card), which may be performed by the other processor (such as secure enclave processor 220-1 in FIG. 2) in the electronic device (such as electronic device 110 in FIGS. 1 and 2) and/or the processor in the secure element (such as secure element 230-1 in FIG. 2) in the electronic device.

During operation, the other processor (which may execute a program module) receives, from a user, a payment command (operation 810), which includes a prepaid amount (and optionally a payment sign), a payment applet for a financial account, and an email address of the recipient (for example, the user of the electronic device may select the email address from a list of existing email addresses or may provide the email address).

Then, the other processor provides the payment command to the secure element (operation 814). Then, the processor may optionally generate a digital signature (operation 816) using a secure hash of a random number and a financial credential (such as a DPAN) associated with the payment applet. Moreover, the processor may optionally encrypt a payment packet (operation 818) using an encryption key, such as an encryption key associated with the payment applet. The encrypted payment packet may include the financial credential, the prepaid amount and the payment sign.

In some embodiments, the other processor may perform optional authentication (operation 812). This optional authentication may involve: requesting authentication information from the user; receiving the authentication information; and comparing the authentication information to stored authentication information. The payment command may be provided by the other processor to the secure element if the authentication information matches the predefined authentication information.

Furthermore, the processor may provide the encrypted payment packet to the other processor (operation 820), which then provides the encrypted payment packet to a third electronic device (operation 822), such as a server computer associated with a provider of the electronic device.

In response, the other processor may receive a token (such as a uniform resource locator) from the third electronic device (operation 824). Next, the other processor may provide the token to the recipient (operation 826), such as to the recipient's email address (and, more generally, to an address associated with the recipient).

Furthermore, the recipient's electronic device indicates that there is a new email. When the recipient activates the token (for example, clicks on or touches the uniform resource locator), their electronic device may contact the third electronic device. If there is a payment applet (such as a debit card) already installed on the secure element in the recipient's electronic device, the third electronic device may add the prepaid amount to the available balance associated with the payment applet (and may charge the financial account associated with the user's payment applet). Alternatively, the third electronic device may provision a new (prepaid) payment applet on the secure element with the prepaid amount (and may charge the financial account associated with the user's payment applet). When the financial transaction is complete, the third electronic device may provide a notification to the electronic device (which is received in operation 828), and the other processor may present the notification to the user. In this way, the user may provide money to the recipient's electronic device.

Figure 8:
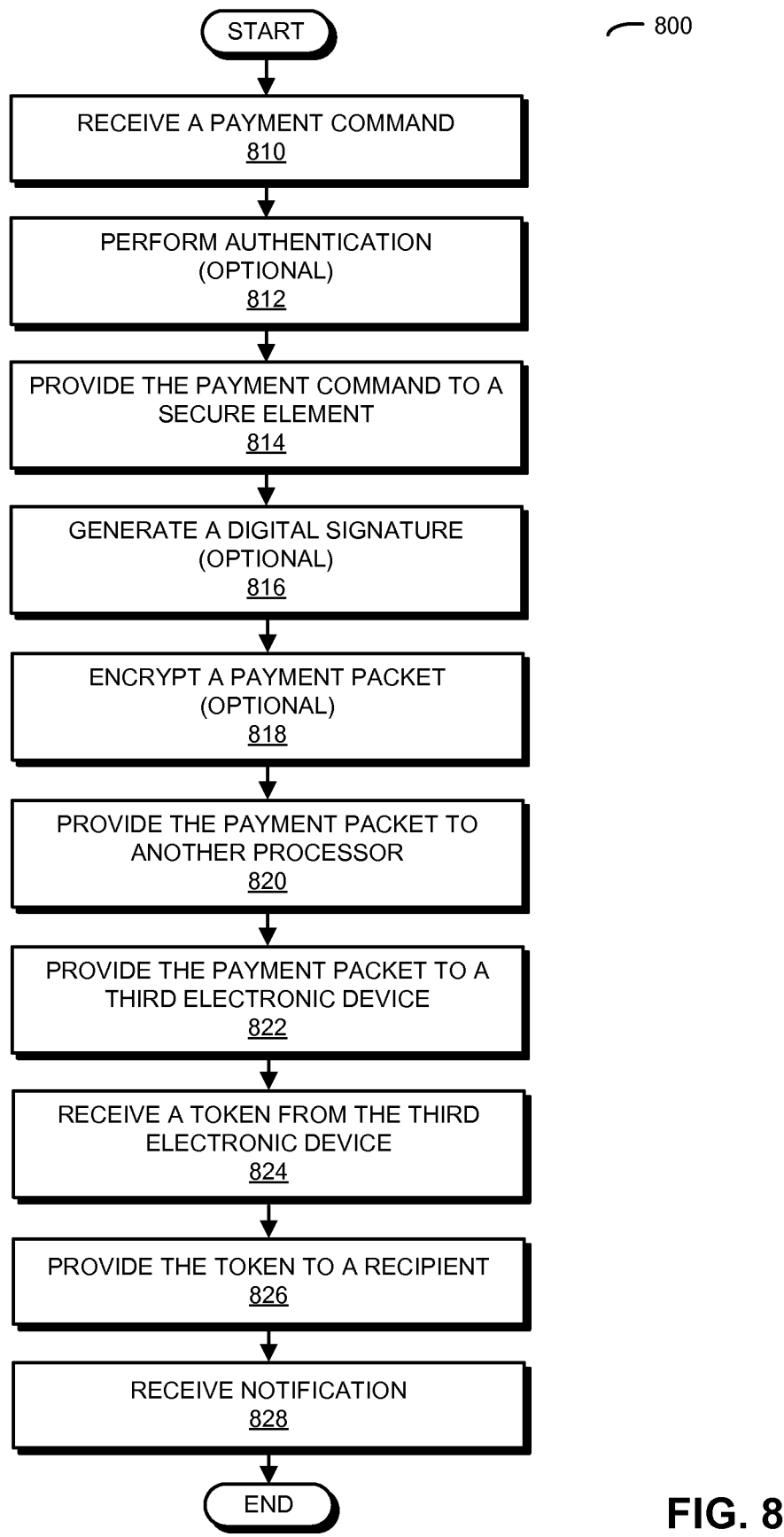
FIG. 8 is a flow diagram illustrating a method for providing prepaid credit to a financial vehicle associated with one of the electronic devices in FIG. 1 in accordance with an embodiment of the present disclosure.
Figure 9:
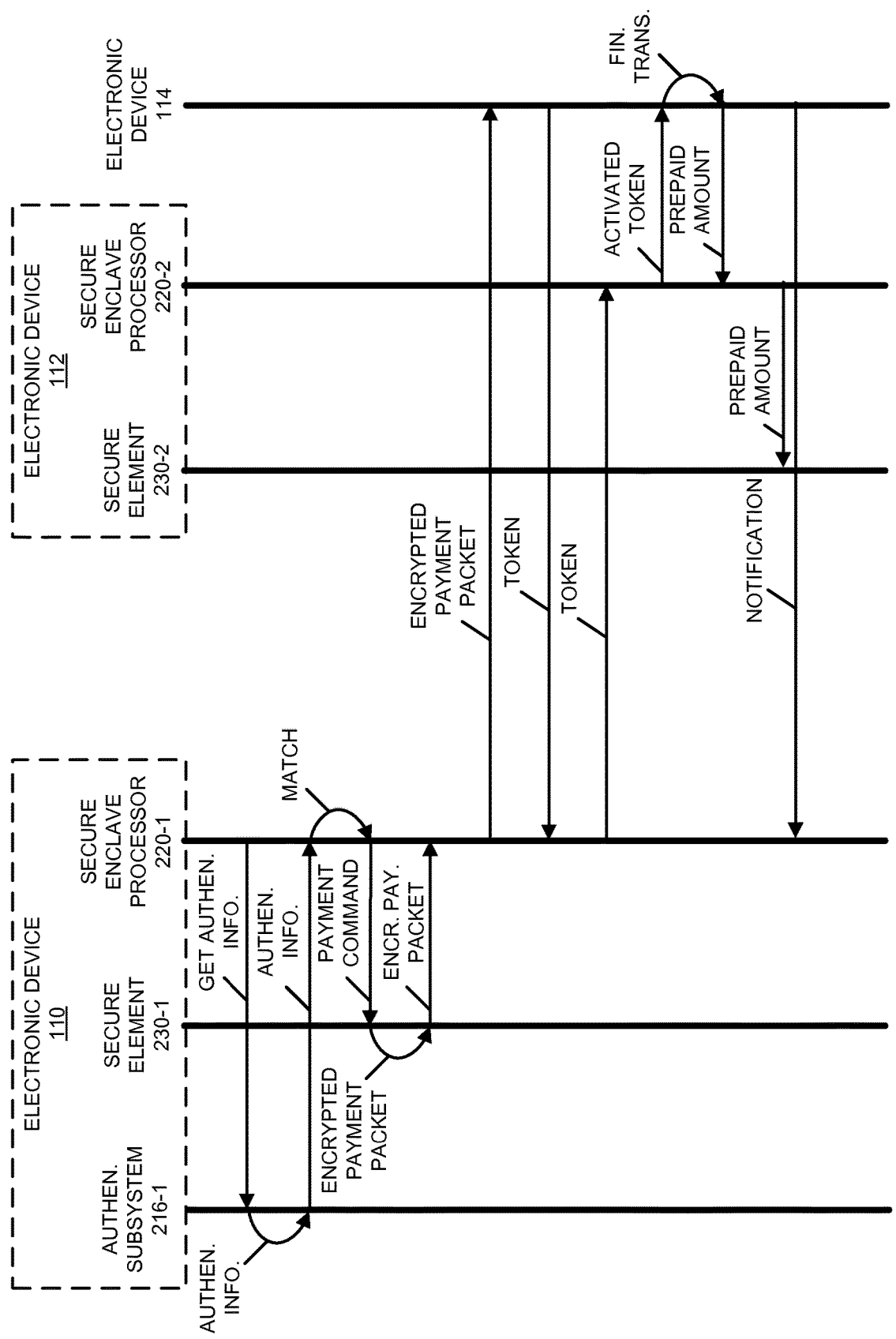
FIG. 9 is a drawing illustrating communication among the electronic devices of FIG. 1 in accordance with an embodiment of the present disclosure.

FIG. 9 presents a drawing illustrating communication within electronic device 110 (FIGS. 1 and 2), within electronic device 112 (FIG. 1), and among electronic devices 110, 112 and 114 (FIG. 1), and which provides further information regarding the aforementioned financial-transaction technique of FIG. 8. In particular, the user of electronic device 110 may provide the payment command with the prepaid amount to secure enclave processor 220-1. In response, secure enclave processor 220-1 may request authentication information from authentication subsystem 216-1.

After authentication subsystem 216-1 receives the authentication information from the user, authentication subsystem 216-1 provides the authentication information to secure enclave processor 220-1. Then, secure enclave processor 220-1 compares the authentication information to stored authentication information. If there is a match, secure enclave processor 220-1 provides an authentication-complete indicator to secure element 230-1, which may set a software flag.

Next, secure enclave processor 220-1 may provide the payment command to secure element 230-1. In response, a specified payment applet may be activated. In addition, secure element 230-1 may generate and provide the encrypted payment packet to secure enclave processor 220-1. Moreover, secure enclave processor 220-1 may provide the encrypted payment packet to electronic device 114.

Subsequently, secure enclave processor 220-1 may receive a token (such as a uniform resource locator) from electronic device 114. Next, secure enclave processor 220-1 may provide the token to the recipient's email address.

The recipient may access their email using electronic device 112, and may activate the token. In response, electronic device 114 may conduct the financial transaction. In particular, electronic device 114 may provide the prepaid amount to an existing payment applet on electronic device 112 or to a new payment applet that electronic device 114 provisions on secure element 230-2. Electronic device 114 may also debit the financial account of the user for the prepaid amount.

When the financial transaction is complete, electronic device 114 may provide a notification to electronic device 110, which may present the notification to the user.

Note that the operations illustrated in FIG. 9 may include challenge and response operations, which are not shown for clarity. In addition, communication via interface circuit 222 (FIG. 2) is not shown for clarity.

In a variation on the preceding financial-transaction technique, the capabilities of the electronic device may be used to provision a new payment applet on the electronic device. For example, if a user does not have a credit card (or a financial vehicle associated with a financial account) on file with the provider of the electronic device, the provider may allow a financial institution (such as a bank) to offer a payment applet with a prepaid amount to the user to encourage the user to use the electronic device to conduct financial transactions (such as mobile payments). If the user accepts the offer, the provider may provision the payment applet on the secure element of the user's electronic device.

The user can then use the prepaid payment applet to perform financial transactions (such as via near-field communication with a point-of-sale terminal). When the account balance gets low, the payment applet (and, more generally, the financial institution) may invite the user to sign up for a regular credit card by entering the additional data required for a credit card or via a website associated with the financial institution. Once approved, the financial institution or the provider may re-provision or convert the financial credential (such as the DPAN) associated with the prepaid payment applet into a regular credit card or debit card.

In these ways, the electronic device may facilitate the conducting of financial transactions.

In some embodiments of methods 400 (FIG. 4), 500 (FIG. 5) and 800 (FIG. 8), there may be additional or fewer operations. Furthermore, the order of the operations may be changed, and/or two or more operations may be combined into a single operation. For example, in FIG. 4, the encrypted payment packet may be provided to the third electronic device instead of the second electronic device, and in FIG. 5 the second payment command may specify the electronic device, the payment amount and the payment sign. Alternatively or additionally, the second electronic device may combine the encrypted payment packet into the second encrypted payment packet, and then may send the second encrypted payment packet to the third electronic device.

In some embodiments, the encrypted payment packet from electronic device 110 (FIGS. 1 and 2) includes constraints on the payment. For example, the payment may be valid for a particular location and/or a particular time interval. Alternatively or additionally, in order to complete the financial transaction, electronic device 114 (FIG. 1) may request authorization from the user of electronic device 110 (FIGS. 1 and 2) or from a user of another electronic device. This may occur if the DPAN associated with the payment applet on electronic device 110 (FIGS. 1 and 2) is a daughter DPAN to a DPAN associated with a payment applet on the other electronic device. For example, a parent may be the owner of the financial account, and may have provisioned the daughter DPAN based on their financial account on electronic device 110 (FIGS. 1 and 2).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit;
   a secure element; and
   a secure enclave processor configured to:
     receive a payment command to conduct a transaction with a second electronic device, wherein the payment command comprises an identifier of an applet, a payment amount, and a payment sign, and wherein the applet is stored in the secure element and the applet comprises an account number identifier that indirectly specifies an account associated with the electronic device; and
     transmit the payment command to the secure element;
   wherein the secure element is configured to:
     receive the transmitted payment command;
     acquire the account number identifier stored in the applet,
     generate, based at least in part on the transmitted payment command, a hash of the acquired account number identifier using a secure hashing function;
     generate a digital signature based at least in part on the generated hash of the acquired account number identifier and a random number;
     acquire an encryption key stored in the secure element, wherein the stored encryption key is associated with the applet;
     generate an encrypted packet based at least in part on the transmitted payment command, the generated digital signature, and the acquired encryption key, wherein the encrypted packet comprises the acquired account number identifier, the generated hash of the acquired account number identifier, the payment amount, and the payment sign; and
     transmit the encrypted packet to the secure enclave processor;
   wherein the secure enclave processor is further configured to:
     receive the transmitted encrypted packet; and
     transmit, using the interface circuit, the transmitted encrypted packet to the second electronic device to perform the transaction.

2. The electronic device of claim 1, further comprising an authentication subsystem, wherein the secure enclave processor is further configured to:
   request authentication information from the authentication subsystem;
   receive the authentication information from the authentication subsystem; and
   determine the received authentication information matches predefined authentication information.

3. The electronic device of claim 1, wherein the interface circuit is further configured to:
   receive, from a third electronic device, a second encrypted packet comprising a second account number identifier that indirectly specifies an account associated with a second applet, the payment amount, and a second payment sign that is the opposite of the payment sign; and
   transmit, to the second electronic device, the second encrypted packet.

4. The electronic device of claim 3, wherein the payment amount and the payment sign in the encrypted payment packet are specified by the second encrypted packet.

5. The electronic device of claim 1, wherein the interface circuit is further configured to receive, from the second electronic device, a notification that the transaction was completed.

6. The electronic device of claim 1, wherein the account number identifier is associated with a prepaid debit card, a credit card, or a gift card.

7. The electronic device of claim 1, wherein the payment amount is specified in the payment command or predefined by the applet.

8. An electronic device, comprising:
   an interface circuit;
   a secure element; and
   a secure enclave processor,
   wherein the interface circuit is configured to:
     receive a first encrypted packet from a second electronic device to conduct a transaction with the second electronic device, wherein the first encrypted packet comprises a first account number identifier that indirectly specifies an account associated with the second electronic device;
   wherein the secure enclave processor is configured to:
     receive a payment command to conduct the transaction with the second electronic device, wherein the payment command specifies an applet, a payment amount, and a payment sign, and wherein the applet is stored in the secure element and the applet comprises a second account number identifier that indirectly specifies an account associated with the electronic device; and
     transmit the payment command to the secure element;
   wherein the secure element is configured to:
     receive the transmitted payment command;
     acquire the second account number identifier stored in the applet,
     generate, based at least in part on the transmitted payment command, a hash of the acquired second account number identifier using a secure hashing function;
     generate a digital signature based at least in part on the generated hash of the acquired second account number identifier and a random number;
     acquire an encryption key stored in the secure element, wherein the stored encryption key is associated with the applet;
     generate a second encrypted packet based at least in part on the transmitted payment command, the generated digital signature, and the acquired encryption key associated with the applet and stored in the secure element, wherein the second encrypted packet comprises the acquired second account number identifier, the generated hash of the acquired second account number identifier, the payment amount, and the payment sign; and
     transmit the second encrypted packet to the secure enclave processor;

wherein the secure enclave processor is further configured to:
receive the transmitted second encrypted packet; and
transmit, using the interface circuit, the received first encrypted packet and the transmitted second encrypted packet to a third electronic device to perform the transaction.

9. A computer implemented method associated with a first electronic device, wherein the first electronic device comprises a secure enclave processor, a secure element, and an interface circuit, the computer implemented method comprising:
receiving, by the secure enclave processor of the first electronic device, a payment command to conduct a transaction with a second electronic device, wherein the payment command comprises an identifier of an applet, a payment amount, and a positive or negative payment sign, and wherein the applet is stored in the secure element of the first electronic device and the applet comprises an account number identifier;
transmitting, by the secure enclave processor, the payment command to the secure element;
receiving, by the secure element, the transmitted payment command;
acquiring, by the secure element, the account number identifier stored in the applet;
generating, by the secure element based at least in part on the transmitted payment command, a hash of the acquired account number identifier using a secure hashing function;
generating, by the secure element, a digital signature based at least in part on the generated hash of the acquired account number identifier and a random number;
acquiring, by the secure element, an encryption key stored in the secure element, wherein the stored encryption key is associated with the applet;
generating, by the secure element, an encrypted packet based at least in part on the transmitted payment command, the generated digital signature, and the acquired encryption key, wherein the encrypted packet comprises the acquired account number identifier, the generated hash of the acquired account number identifier, the payment amount, and the payment sign;
transmitting, by the secure element, the encrypted packet to the secure enclave processor;
receiving, by the secure enclave processor, the transmitted encrypted packet; and
transmitting, by the secure enclave processor using the interface circuit, the transmitted encrypted packet to the second electronic device.

10. The computer implemented method of claim 9, further comprising:
requesting, using the secure enclave processor, authentication information from an authentication subsystem of the first electronic device;
receiving, using the secure enclave processor, the authentication information from the authentication subsystem; and
determining, using the secure enclave processor, the received authentication information matches predefined authentication information.

11. The computer implemented method of claim 9, further comprising:
receiving, from a third electronic device, a second encrypted packet comprising a second account number identifier that indirectly specifies an account associated with a second applet, the payment amount, and a second payment sign that is the opposite of the payment sign; and
transmitting, using the interface circuit, the second encrypted packet to the second electronic device.

12. The computer implemented method of claim 9, further comprising:
receiving, using the interface circuit, a notification that the transaction was completed.

13. The electronic device of claim 8, further comprising an authentication system, wherein the secure enclave processor is further configured to:
request authentication information from the authentication subsystem;
receive the authentication information from the authentication subsystem; and
determine the received authentication information matches predefined authentication information.

14. The computer implemented method of claim 9, wherein the account number identifier is associated with a prepaid debit card, a credit card, or a gift card.

15. The electronic device of claim 1, wherein the account number identifier is a device primary account number (DPAN), and wherein the secure enclave processor is further configured to map the DPAN to a financial primary account number (FPAN) prior to transmitting the transmitted encrypted packet to the second electronic device.

16. The electronic device of claim 1, wherein the transmitted encrypted packet comprises a constraint on performing the transaction, wherein the constraint is based at least in part on a location or a time interval.

17. The electronic device of claim 2, wherein the received authentication information comprises a biometric identifier, a personal identification number associated with the applet, or a passcode.

18. The computer implemented method of claim 9, wherein the account number identifier is a device primary account number (DPAN), and further comprising:
mapping, by the secure enclave processor, the DPAN to a financial primary account number (FPAN) prior to transmitting the transmitted encrypted packet to the second electronic device.

19. The computer implemented method of claim 9, wherein the transmitted encrypted packet comprises a constraint on performing the transaction, wherein the constraint is based at least in part on a location or a time interval.

20. The computer implemented method of claim 10, wherein the received authentication information comprises a biometric identifier, a personal identification number associated with the applet, or a passcode.

* * * * *